US009009438B2

(12) United States Patent
Fiske et al.

(10) Patent No.: US 9,009,438 B2
(45) Date of Patent: Apr. 14, 2015

(54) SPACE RECLAMATION IN MULTI-LAYERED AND THIN PROVISIONED STORAGE SYSTEMS

(75) Inventors: Rahul M. Fiske, Pune (IN); Carl E. Jones, Tucson, AZ (US); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 13/151,140

(22) Filed: Jun. 1, 2011

(65) Prior Publication Data

US 2012/0311291 A1 Dec. 6, 2012

(51) Int. Cl.
  *G06F 12/02* (2006.01)
  *G06F 3/06* (2006.01)
(52) U.S. Cl.
  CPC ............ *G06F 3/0608* (2013.01); *G06F 3/0665* (2013.01); *G06F 3/067* (2013.01); *G06F 3/0659* (2013.01)
(58) Field of Classification Search
  CPC ....... G06F 3/067; G06F 3/0665; G06F 3/061; G06F 3/0604; G06F 3/0605; G06F 3/0614; G06F 3/0626; G06F 12/00; G06F 12/08; G06F 17/30091; G06F 17/30233; G06F 21/604; G06F 9/45533; G06F 2009/45583; G06F 3/0608; G06F 3/0659; G06F 3/0631; G06F 3/0643; G06F 3/0629; G06F 2212/151; G06F 2212/152; G06F 2201/815
  USPC .................. 711/159, 170, E12.001, E12.002, 711/E12.016, 6, 117, 203; 718/1, 104
  See application file for complete search history.

(56) References Cited

U.S. PATENT DOCUMENTS

| 5,664,187 A * | 9/1997 | Burkes et al. ................. 711/114 |
| 6,574,721 B1 * | 6/2003 | Christenson et al. ......... 711/209 |
| 6,636,879 B1 | 10/2003 | Doucette et al. |
| 7,386,662 B1 * | 6/2008 | Kekre et al. .................... 711/113 |
| 7,558,905 B2 | 7/2009 | Sinclair et al. |
| 7,584,340 B1 * | 9/2009 | Colgrove ....................... 711/163 |
| 7,587,568 B2 | 9/2009 | Muthulingam et al. |

(Continued)

OTHER PUBLICATIONS

"Optimize Thin Storage Utilization with Hitachi Dynamic Provisioning and Veritas Storage Foundation by Symantec", Hitachi Data Systems, Sep. 2010.

(Continued)

*Primary Examiner* — Yaima Rigol
*Assistant Examiner* — Edward Waddy, Jr.
(74) *Attorney, Agent, or Firm* — Kunzler Law Group (57) ABSTRACT

An approach to efficient space reclamation in multi-layered thinly provisioned systems. A parent storage volume is thinly provisioned, and uses one or more child storage volumes that are also thinly provisioned for storage. A reclamation command sent to the device providing the parent thinly provisioned storage volume identifies that data has been released, and that the physical storage storing that data can be placed in a free pool and used to satisfy future write requests in the parent storage volume. An identify module identifies which child storage volumes supporting the parent storage volume are thinly provisioned. The data is released at the level of the parent storage volume, and the reclamation command is sent to the child storage volumes supporting the parent storage volume and that are themselves thinly provisioned. The storage is thus released by all affected thinly provisioned storage volumes, and not just the parent storage volume that received the reclamation command.

17 Claims, 6 Drawing Sheets

(56) References Cited

U.S. PATENT DOCUMENTS

| | | | |
|---|---|---|---|
| 7,594,085 B1 | 9/2009 | Rao | |
| 7,603,532 B2 | 10/2009 | Rajan et al. | |
| 7,636,814 B1* | 12/2009 | Karr et al. | 711/143 |
| 8,099,568 B2* | 1/2012 | Colbert et al. | 711/159 |
| 8,156,306 B1* | 4/2012 | Raizen et al. | 711/202 |
| 8,171,201 B1* | 5/2012 | Edwards, Sr. | 711/6 |
| 8,219,681 B1* | 7/2012 | Glade et al. | 709/226 |
| 8,230,085 B2* | 7/2012 | Roa | 709/229 |
| 8,316,161 B1* | 11/2012 | Contreras et al. | 710/38 |
| 8,549,223 B1* | 10/2013 | Kaliannan et al. | 711/114 |
| 2006/0218360 A1* | 9/2006 | Burkey | 711/154 |
| 2008/0072000 A1* | 3/2008 | Osaki et al. | 711/162 |
| 2008/0229048 A1* | 9/2008 | Murase et al. | 711/171 |
| 2009/0089516 A1* | 4/2009 | Pelts et al. | 711/154 |
| 2009/0248763 A1* | 10/2009 | Rajan et al. | 707/204 |
| 2010/0262802 A1* | 10/2010 | Goebel et al. | 711/166 |
| 2011/0066802 A1* | 3/2011 | Kawaguchi | 711/114 |
| 2011/0153977 A1* | 6/2011 | Root et al. | 711/171 |
| 2011/0208931 A1* | 8/2011 | Pendharkar et al. | 711/162 |
| 2011/0258406 A1* | 10/2011 | Suetsugu et al. | 711/162 |
| 2012/0047346 A1* | 2/2012 | Kawaguchi | 711/165 |
| 2012/0054306 A1* | 3/2012 | Vaghani et al. | 709/217 |
| 2012/0233434 A1* | 9/2012 | Starks et al. | 711/170 |
| 2012/0278580 A1* | 11/2012 | Malige et al. | 711/166 |
| 2012/0278584 A1* | 11/2012 | Nagami et al. | 711/170 |

OTHER PUBLICATIONS

Wendt, "Intelligent Versus Zero Page Storage Reclamation: Making the Right Choice for Managing Thinly Provisioned Volumes", Toolbox.com, Jun. 21, 2010.

* cited by examiner

SPACE RECLAMATION IN MULTI-LAYERED AND THIN PROVISIONED STORAGE SYSTEMS

FIELD

The subject matter disclosed herein relates to thin provisioning, and more particularly to multiple levels of thin provisioning within an enterprise environment.

BACKGROUND

Description of the Related Art

Thin provisioning is a method for optimizing storage allocation by presenting a logical address space that is larger than the physical storage actually available. Devices that present and manage a thin provisioned storage space are referred to in this application as storage virtualization devices. A storage virtualization device implementing thin provisioning on a storage system may, for example, present applications with an address space that represents 10 TB of storage when, in fact, there are only 2 TB of actual, physical, storage in the storage system.

In a thinly provisioned storage system, the storage virtualization device allocates the physical storage to the logical address space when data is actually written by an application to the logical address space. Thus, for example, a first WRITE operation to an address range in the logical address space alerts the storage virtualization device that fresh physical storage must be allocated. The storage virtualization device allocates enough physical storage to fulfill the WRITE operation, and associates the allocated physical storage with the address range.

A thinly provisioned virtual storage system may itself use thinly provisioned storage; for example, a storage area network (SAN) virtualization device may present a thinly provisioned storage volume, and use one or more disks as physical storage to support this storage volume. These disks that the SAN uses may themselves be thinly provisioned. A host may provide a thinly provisioned storage volume, and use a thinly provisioned storage system provided by a SAN as storage to support the thinly provisioned storage volume. Such systems are multi-layered, thinly provisioned storage systems.

Having virtual storage systems that are layered provide a number of advantages; however, they also present challenges when attempting to reclaim storage space.

BRIEF SUMMARY

An approach to efficient space reclamation is provided below. The summary that follows is for convenience, and is not a limitation on the claims. In one embodiment, a system for efficient space reclamation includes a storage area network (SAN) virtualization device providing at least one thinly provisioned SAN storage volume. The SAN storage volume has a logical size larger than a physical size of the SAN storage volume. The physical size may be provided by one or more child disk storage volumes.

A disk virtualization device provides a thinly provisioned child disk storage volume. The thinly provisioned child disk storage may have a logical size larger than its physical size. The thinly provisioned child disk storage may provide storage for the thinly provisioned SAN storage volume.

A receive module receives a first reclamation command for the thinly provisioned SAN storage volume. The reclamation command identifies releasable storage space for the SAN virtualization device. An identify module identifies the thinly provisioned child disk storage volume, and a send module sends a second reclamation command to the disk virtualization device. The second reclamation command identifies releasable storage space for the disk virtualization device.

The system may include multiple disk virtualization devices providing thinly provisioned child disk storage volumes. In such systems, the identify module may identify each thinly provisioned child disk storage volume, and the send module may send the second reclamation command to each disk virtualization device. The second reclamation command may be directed to the corresponding block range that is provided by the child disk storage system after virtual to physical mapping is done. The disk virtualization devices and the SAN virtualization device may advertise to higher levels whether it is providing a thinly provisioned storage system. This advertisement may allow the identification modules to easily and accurately identify thinly provisioned child storage volumes.

The invention may be realized as a computer program product. The computer program product may cause receiving the first reclamation command for a thinly provisioned storage system, and identifying one or more child thinly provisioned storage volumes that provide storage for the thinly provisioned storage system that received the first reclamation command. The computer program product may also cause sending second reclamation commands to the child thinly provisioned storage volumes so identified. The computer program product may send the second reclamation commands using the space reclamation method supported by the underlying layers. As above, the computer program product may cause the device to advertise whether it provides thin provisioning. The advertisement may be accomplished by storing one or more bits in a small computer system interface (SCSI) inquiry page. The thinly provisioned storage volume that is the parent may be managed by a host virtualization device, a SAN virtualization device, or other virtualization device. The computer program product may also determine which of the child thinly provisioned storage volumes are affected by the first reclamation command, and sending the second reclamation commands to only those child thinly provisioned storage volumes so affected.

The invention may be realized as a method involving receiving the first reclamation command that identifies releasable storage space in the thinly provisioned system, identifying storage volumes that are thinly provisioned and that provide storage for the thinly provisioned system, and sending second reclamation commands to the storage volumes that are thinly provisioned and that provide storage for the thinly provisioned system. The method may also involve translating virtual addresses in the reclamation command to physical addresses.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
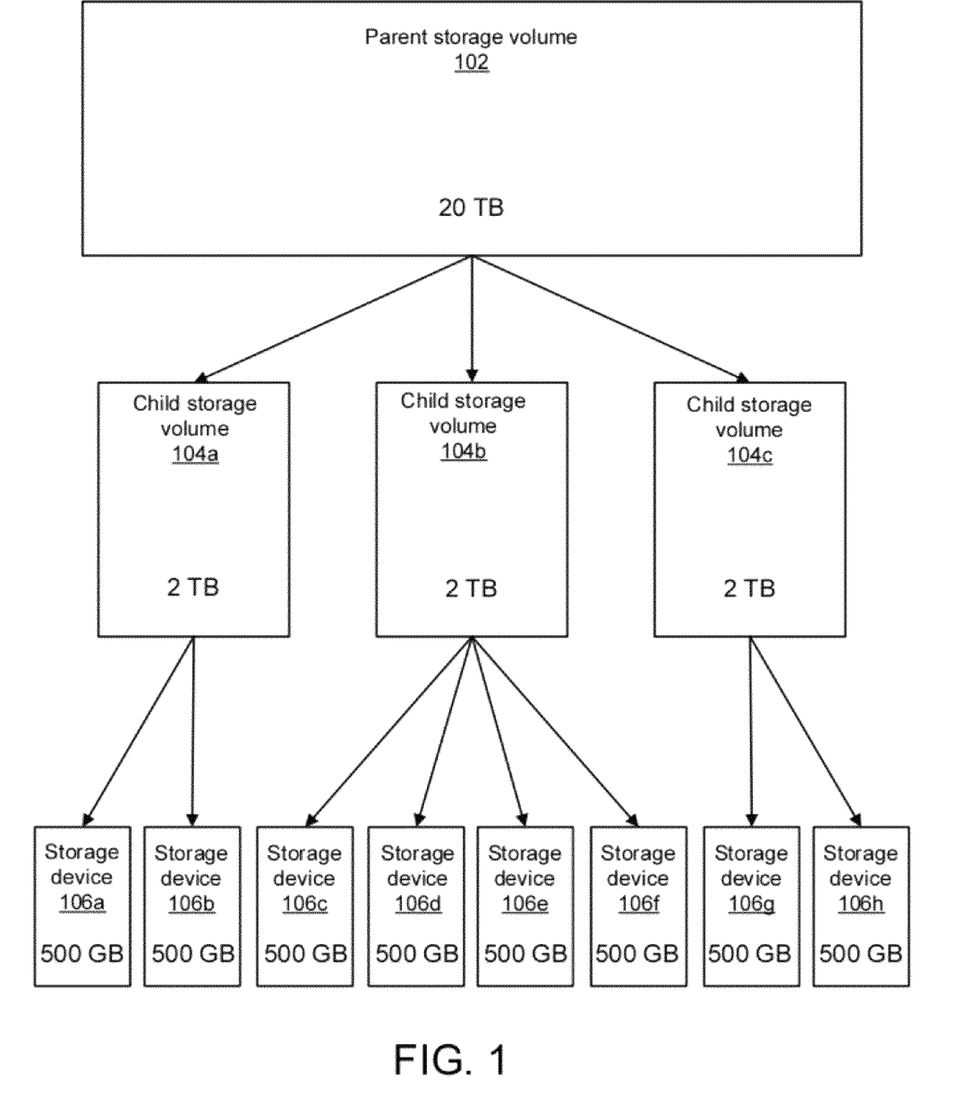
FIG. 1 is an illustrative block diagram showing one embodiment of a system with multi-layered thin provisioning.

FIG. 1 depicts one embodiment of a system 100 with a parent storage volume 102, child storage volumes 104a-c, and storage devices 106a-h. The term "storage volume" in this application refers to a logical volume for storing data. The storage volumes may be, for example, a logical unit identified by a logical unit number (LUN). Certain storage volumes may be thinly provisioned. Other storage volumes may not. The term "thin provisioning" in this application refers to presenting a logical size of a storage volume that is larger than the physical size of the storage space supporting the storage volume.

Parent storage volume 102 is a thinly provisioned storage volume. In the example shown in FIG. 1, the parent storage volume 102 has a logical size of 20 Terabytes (TB). However, the sizes of the child storage volumes 104a-c supporting the parent storage volume 102 and providing storage space are each 2 TB, adding to a total of 6 TB. Thus, the logical size of the parent storage volume 102 is larger than the physical size (as seen by the parent storage volume 102) of the child storage volumes 104a-c supporting the parent storage volume 102.

In FIG. 1, the child storage volume 104a presents a logical size of 2 TB, but is supported by storage devices 106a-b, which have a physical size of 500 Gigabytes (GB) each, totaling 1 TB. Thus, child storage volume 104a is also thinly provisioned as it presents a logical size (2 TB) larger than the physical size of the storage space (1 TB) of the storage devices 106a-b supporting the child storage volume 104(a). Child storage volume 104b has a logical size of 2 TB and a physical size of 2 TB, and thus is not thinly provisioned. Child storage volume 104c has a logical size of 2 TB and a physical size of 1 TB, and is thus thinly provisioned.

In a storage system that is thinly provisioned, blocks of data are allocated on demand, as opposed to up front allocation. Implementing thin provisioning helps eliminate whitespace and inefficient storage capacity utilization, and allow organizations to defer storage capacity upgrades until data usage justifies the upgrades. In certain embodiments, one or more of the child storage volumes 104 are set up using a redundant array of independent drives (RAID) configuration of storage devices 106.

Figure 2:
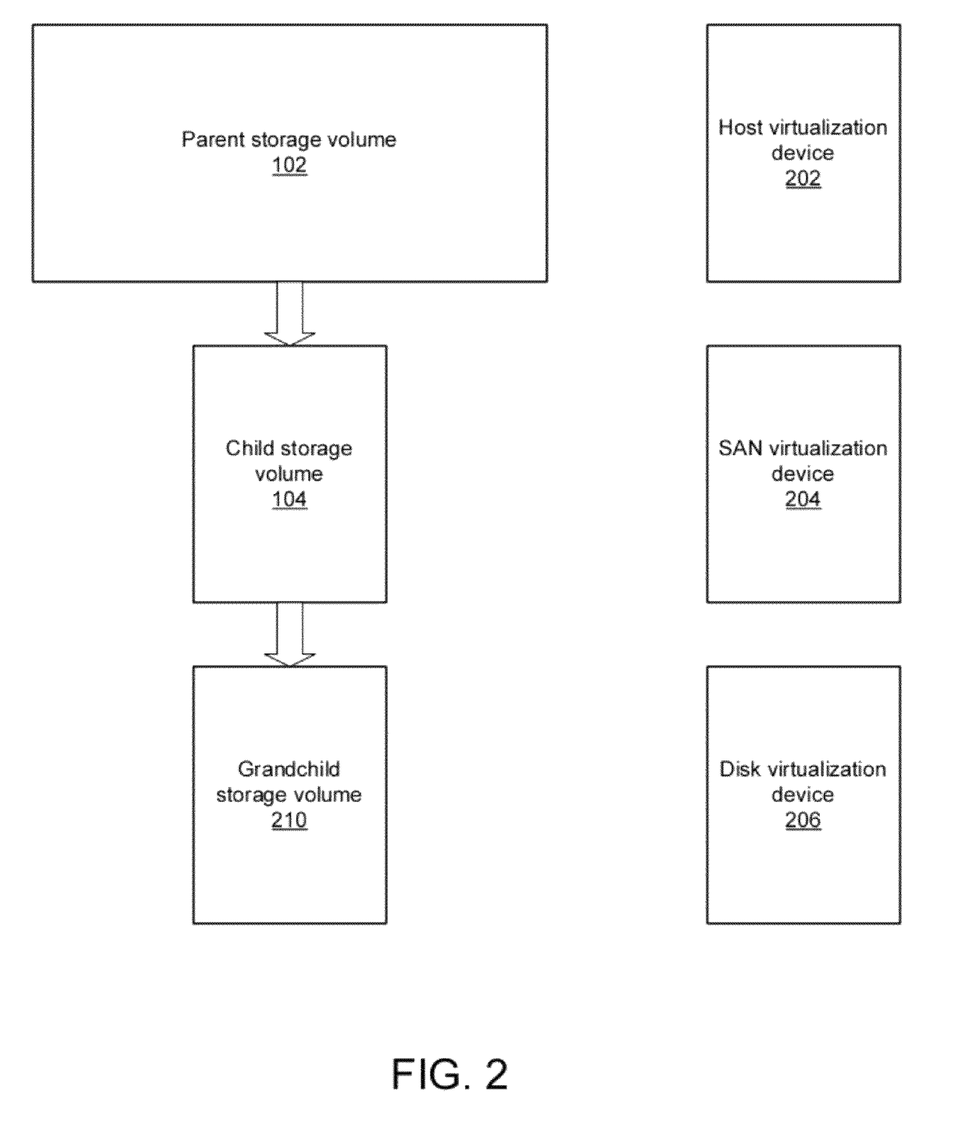
FIG. 2 is an illustrative block diagram showing one embodiment of a system with virtualization devices providing multi-layered thin provisioning.

FIG. 2 shows a parent storage volume 102 that is provided and managed by a host virtualization device 202, a child storage volume 104 managed by a SAN virtualization device 204, and a grandchild storage volume 210 managed by a disk virtualization device 206. The host virtualization device 202, SAN virtualization device 204, and the disk virtualization device 206 may be components of an enterprise storage cloud.

In the embodiment depicted in FIG. 2, the host virtualization device 202 provides and manages the parent storage volume 102. The host virtualization device 202 is a device that provides storage virtualization functionality on a host. In one embodiment, the host virtualization device 202 is a Veritas Volume Manager® (VxVM) device. The SAN virtualization device 204 provides storage virtualization functionality at the SAN or Storage network level. The SAN virtualization device 204 provides a child storage volume 104 for the parent storage volume 102 in the embodiment shown in FIG. 2. The SAN virtualization device 204 may be, for example, an IBM® Storwize V7000® or similar device. The disk virtualization device 206 is a disk storage controller that provides storage virtualization. In FIG. 2, the disk virtualization device 206 provides the grandchild storage volume 210 for the child storage volume 104. The disk virtualization device 206 may provide storage virtualization at the array level. The disk virtualization device 206 may be, for example, an EMU DMX® device, an IBM® XIV® or DS8000® device, or other device.

The descriptors "parent," "child," and "grandchild" refer to the relationships between storage volumes, and may depend upon the perspective of a particular figure. For example, in FIG. 2, the storage volume managed by the host virtualization device 202 is referred to as the parent storage volume 102, while the storage volume managed by the SAN virtualization device 204 is referred to as the child storage volume 104. However, it is equally correct to refer to the child storage volume 104 as a parent storage volume, and the grandchild storage volume 210 as the child storage volume, when the perspective changes. Thus, from the perspective of the grandchild storage volume 210, the child storage volume 104 is the parent storage volume. The labels "parent," "child," and "grandchild," should thus be seen as labels describing relationships, and that the storage volume provided by a SAN virtualization device 204 can be correctly considered a parent storage volume 102. Thus, terms such as parent storage volume 102 and SAN storage volume 302 are not mutually exclusive; a particular SAN storage volume 302 may be a parent storage volume 102. The same SAN storage volume 302 may also be a child storage volume 104.

Figure 3:
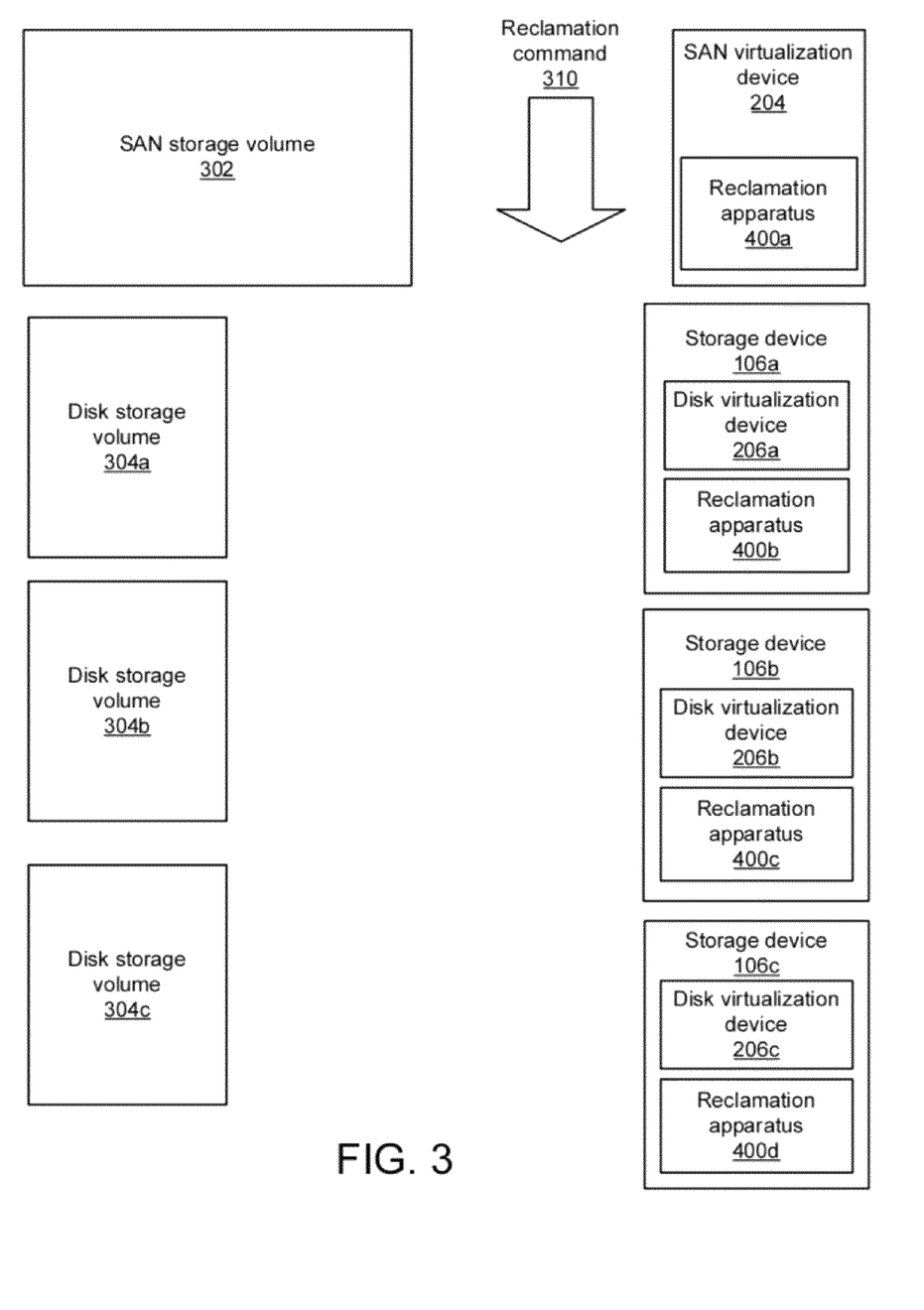
FIG. 3 is an illustrative block diagram showing one embodiment of a system with virtualization devices providing multi-layered thin provisioning receiving a reclamation command.

FIG. 3 shows an embodiment of a system where a SAN storage volume 302 is managed by a SAN virtualization device 204. Disk storage volumes 304a-c are presented and managed by storage devices 106a-c with disk virtualization devices 206a-c respectively. While FIG. 3 shows each storage device 106a-c providing one disk storage volume 304a-c, a storage device 106a-c may, in certain embodiments, provide more than one disk storage volume 304a-c. Similarly, a SAN virtualization device 204 may present more than one SAN storage volume 302. The term storage device is used broadly to refer to devices and/or subsystems that can provide data storage, including disk drives, RAID systems, tape drives, storage subsystems, and other devices and subsystems.

The SAN virtualization device 204 provides at least one SAN storage volume 302 that has a logical size that is larger than the physical size of the SAN storage volume 302. The physical size of the SAN storage volume 302 may be provided by the disk storage volumes 304a-c. The disk virtualization devices 206a-c may provide disk storage volumes 304a-c that are child disk storage volumes 304a-c to the SAN storage volume 302. A child disk storage volume 304 is a storage volume that is both a disk storage volume 304 and a child storage volume 104 providing storage for some parent storage volume 102. In FIG. 3, the disk storage volumes 304a-c are the storage volumes that are used for the SAN storage volume 302, which is the parent storage volume 102. The child disk storage volumes 304a-c may also have respective logical sizes that are larger than the respective physical sizes of the child disk storage volumes 304a-c.

FIG. 3 also shows a reclamation command 310. In a thinly provisioned system, when an application is finished with data that is stored in the parent storage volume 102, the application preferably sends a notification releasing the data and indicating that the physical storage used to store that data can be reclaimed and returned to the free pool of physical storage that supports the parent storage volume 102. In this application, the term "reclamation command" 310 means a notification that identifies releasable physical storage that can be returned to the free pool of physical storage supporting the thinly provisioned system. The reclamation command 310 notifies the virtualization device that it can use the physical storage location that stored the released data to store future data. Because this information is not normally conveyed in systems that are not thinly provisioned, storage vendors have created various mechanisms to allow higher level applications (such as file systems) to tell the relevant virtualization device managing the thinly provisioned storage that the application is finished with the data, and that the physical space storing the data can be reclaimed. These messages are referred to in this application as reclamation commands. For example, some vendors require that the application send a reclamation command 310 that is a SCSI WRITE SAME command, with zeros as the data, for the address range of the released data. When the storage virtualization device receives the reclamation command 310, it knows that the physical storage associated with the specified address range can be returned to the free pool of physical storage that is used to satisfy storage operations against the thinly provisioned storage volume, such as WRITE operations.

Thus, for example, an application may send the reclamation command 310 to the SAN virtualization device 204, where the reclamation command 310 identifies releasable storage space. However, in systems with multi-layered thinly provisioned storage volumes (such as the parent storage volume 102 which is layered over the child storage volumes 104a-c), the reclamation command 310 may not actually release the necessary storage space. In FIG. 3, the SAN virtualization device 204 may release the storage space, but the disk virtualization devices 206a-c may not receive a reclamation command 310 absent the reclamation apparatus 400. When the storage devices 106a-c present thinly provisioned child storage volumes 104a-c, the disk virtualization devices 206a-c will not release the physical storage space since they did not receive the reclamation command 310. The reclamation command 310 is received and interpreted by the SAN virtualization device 204 only, causing inefficiencies in the managing the thinly provisioned child storage volumes 104a-c below.

In FIG. 3, the SAN virtualization device 204, and the storage devices 106a-c providing storage for the SAN virtualization device 204, include reclamation apparatus 400a-d. In certain embodiments, the reclamation apparatus 400a receives the reclamation command 310, identifies those child storage devices 106a-c with disk virtualization devices 206a-c providing child storage volumes 104a-c that have logical size larger than physical size, and sends additional reclamation commands 310 to the reclamation apparatus 400b-d of those storage devices 106a-c that provide thinly provisioned child storage volumes.

The reclamation apparatus 400a may be configured to receive a reclamation command 310 (referred to as a first reclamation command) for a thinly provisioned storage volume managed by the virtualization device having the reclamation apparatus 400a. For example, the reclamation apparatus 400a of the SAN virtualization device 204 may receive the reclamation command 310 for the SAN storage volume 302. The reclamation apparatus 400a may identify one or more child storage volumes 104 that are thinly provisioned and that are storage for the thinly provisioned storage system. For example, the reclamation apparatus 400a may identify the disk storage volumes 304a-c as being child storage volumes that are thinly provisioned and that are storage for the SAN storage volume 302. In another case, only disk storage volumes 304a and 304b may be thinly provisioned, and identified as such, by the reclamation apparatus 400a. The reclamation apparatus 400a may also be configured to send reclamation commands to the child thinly provisioned storage volumes so identified. These reclamation commands sent by the reclamation apparatus 400a may be referred to as second reclamation commands. The second reclamation commands also identify the releasable storage space.

Thus, the first reclamation command may identify releasable storage space for the SAN virtualization device 204, and the second reclamation commands may identify releasable storage space for the disk virtualization devices 206a-c. In this manner, reclamation apparatus 400a-d may work to ensure that a reclamation command 310 is properly shared with thinly provisioned storage volumes in the system. This, in turn, allows the virtualization devices implementing the thinly provisioned storage systems to make intelligent decisions about the management and use of physical storage supporting the thinly provisioned storage systems.

The reclamation apparatus 400a-d may also translate the first reclamation command 310 to another format used by the child thinly provisioned storage volumes when generating second reclamation commands. For example, the first reclamation command 310 may be a SCSI WRITE command and may be used to overwrite large regions with zeros. However, a disk virtualization device 206a may require that any reclamation command 310 sent to it be a SCSI WRITE SAME command or use a proprietary reclamation command 310 format. Thus, the reclamation apparatus 400a-d may also need to translate the first reclamation command 310 from a first format to a second format that the disk virtualization devices 206 can interpret.

Figure 4:
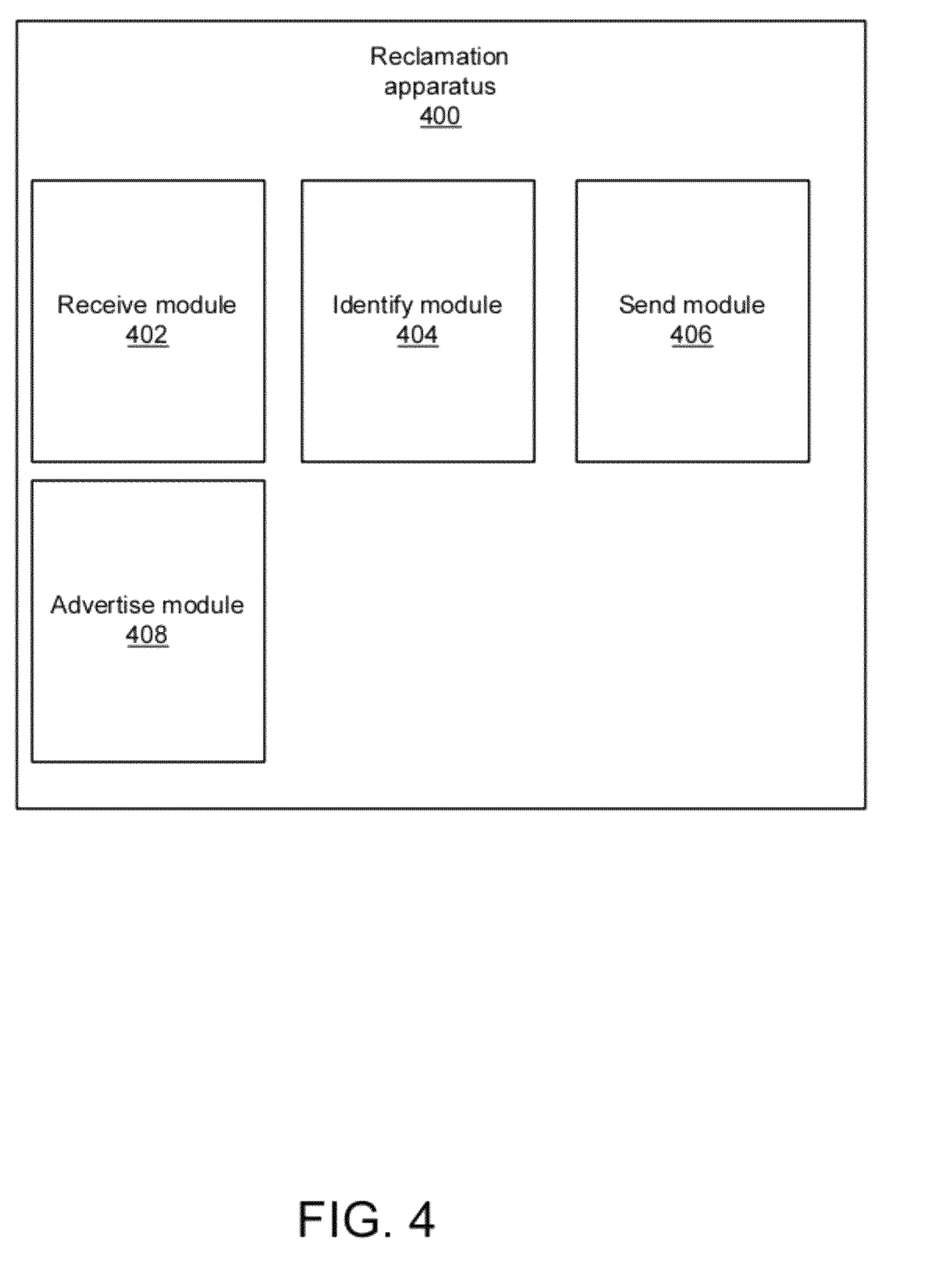
FIG. 4 is an illustrative block diagram showing one embodiment of a reclamation apparatus.

FIG. 4 shows one embodiment of a reclamation apparatus 400. The reclamation apparatus 400 may be software, firmware, hardware, or a combination thereof. The reclamation apparatus 400 may be implemented on a virtualization device such as a SAN volume controller, disk storage controller, or the like. In the depicted embodiment, the reclamation apparatus 400 includes a receive module 402, an identify module 404, a send module 408, and an advertise module 408.

The receive module 402 may be configured to receive a reclamation command 310 for a particular storage volume, such as the SAN storage volume 302, that is thinly provisioned. The reclamation command 310 may identify releasable storage space for the SAN virtualization device 204 managing the SAN storage volume 302. In certain embodiments, the reclamation command 310 is a SCSI WRITE SAME command specifying that zeros be written to a particular physical address range.

The identify module 404 may identify the disk storage volumes 304 that are thinly provisioned and that support the SAN storage volume 304. The disk storage volumes 304 may provide the physical storage for the SAN storage volume 304, and thus provide the physical size of the SAN storage volume 304. There may be more than one thinly provisioned disk storage volume 304 supporting the SAN storage volume 304. The identify module 404 may identify each thinly provisioned disk storage volume 304 that supports the SAN storage volume 304. While this discussion references disk storage volumes 304, the identify module 404 may be configured to identify any child storage volume 104 that is thinly provisioned and that supports the parent storage volume 102.

The identify module 404 may automatically determine which disk storage volumes are thinly provisioned. In one embodiment, the identify module 404 identifies the thinly provisioned disk storage volumes 304 by querying the disk storage volumes 304 in the system. The identify module 404 may query the disk storage volumes 304 when the system is first brought online, and store the information about which disk storage volumes 304 are thinly provisioned in memory. The identify module 404 may similarly store information about which disk storage volumes 304 are not thinly provisioned. The identify module 404 may send queries as disk storage volumes 304 are added or modified in the system. The identify module 404 may determine whether or not a bit is set on the SCSI inquiry page associated with the disk storage volume 304 in order to determine whether a particular disk storage volume 304 is thinly provisioned. In other embodiments, a system administrator indicates to the identify module 404 which disk storage volumes 304 are thinly provisioned.

In certain embodiments, the identify module 404 also identifies one or more formats for the second reclamation command 310 that are understood by the respective virtualization devices providing the physical storage. The identify module 404 may identify the formats automatically, or the supported formats may be provided by the system administrator.

The send module 406 may send reclamation commands 310 to the thinly provisioned disk storage volumes 304 identified by the identify module 404. These reclamation commands 310 (also referred to as second reclamation commands) identify releasable storage for the disk virtualization devices 206. The second reclamation commands 310 may be copies of the first reclamation command 310. While this discussion references disk storage volumes 304 and disk virtualization devices 206, the send module 406 may be configured to work with any child storage volume 104 that supports the parent storage volume 102, and the associated virtualization devices.

In one embodiment, the send module 406 determines which of the thinly provisioned disk storage volumes 304 that support the SAN storage volume 302 are affected by the reclamation command 310 received by the SAN virtualization device 204. For example, the reclamation command 310 may specify a particular address range. The address range may address storage provided by the thinly provisioned disk storage volume 304a, but not storage provided by the thinly provisioned disk storage volume 304b. The send module 406 may determine that only the disk storage volume 304a is affected by the reclamation command 310, and thus send a second reclamation command only to the disk virtualization device 206a. In other embodiments, the send module 406 sends the second reclamation commands to all disk virtualization devices 206 in the system, and each disk virtualization device 206 determines for itself whether any action is required.

The send module 406 may map the addresses specified in the first reclamation command 310 to one or more addresses affected by the reclamation command 310. The send module 406 may maintain or use a virtualization map that maps virtual logical block addresses (LBAs) used in the parent storage volume 102 (such as the SAN storage volume 302) to physical block addresses (PBAs) and/or LBAs used in the supporting child storage volumes 104. For example, the first reclamation command 310 received by the receive module 402 may specify a range of LBAs to be released. The reclamation command 310 may specify a first LBA and a size to be released. The send module 406 may determine that the range of LBAs in the first reclamation command 310 includes LBAs that are part of a first child storage volume 104a and a second child storage volume 104b using a map. The send module 406 may generate two second reclamation commands (one for each child storage volume) and map the addresses from the first reclamation command 310 to the second reclamation commands such that each child storage volume 104 receives a second reclamation command directed to the addresses in the child storage volume 104. An example of this is given in connection with FIG. 5. This mapping may also ensure that second reclamation commands account for, and properly cause release on, RAID drives.

The reclamation apparatus 400 may also include an advertise module 408. The advertise module 408 may advertise that the disk virtualization device 206 provides disk storage volumes 304a that are thinly provisioned. For example, the disk virtualization device 206a may advertise that the disk storage volume 304a is thinly provisioned and has a logical size larger than physical size. Similarly, the SAN virtualization device 204 may include an advertise module 408 that advertises that the SAN storage volume 302 has a logical size that is larger than its physical size.

In one embodiment, the advertise module 408 advertises that the disk storage volume 304 is thinly provisioned by providing a special bit in the SCSI Inquiry Page 0x83. The identify module 404 of the SAN virtualization device 204 may be configured to send a SCSI command to each disk virtualization device 206 providing a disk storage volume 304 for the SAN storage volume 302 when the storage pool is created for the SAN storage volume 302. The SCSI command may be to determine whether or not the special bit in the SCSI Inquiry Page has been set by the advertise modules 408 for the disk storage volumes 304. The identify module 404 may cache whether or not the bit has been set.

In embodiments such as that given above, when the receive module 402 of the SAN virtualization device 204 receives a reclamation command 310, the send module 406 may replicate the reclamation command 310 to each disk virtualization device 206 that provides a thinly provisioned disk storage volume 304 used by the SAN storage volume 302. The SAN virtualization device 204 may release the storage space itself, in addition to passing the reclamation command 310 to other thinly provisioned disk storage volumes 304 supporting the SAN storage volume 302. The disk virtualization devices 206 that receive the second reclamation commands 310 may release the physical storage referenced in the commands that are part of the disk storage volumes 304 that they respectively manage. In certain embodiments, the reclamation apparatus 400b-d in the storage devices 106a-c similarly send the reclamation command if the disk storage volumes 304a-c also use thinly provisioned storage volumes.

Figure 5:
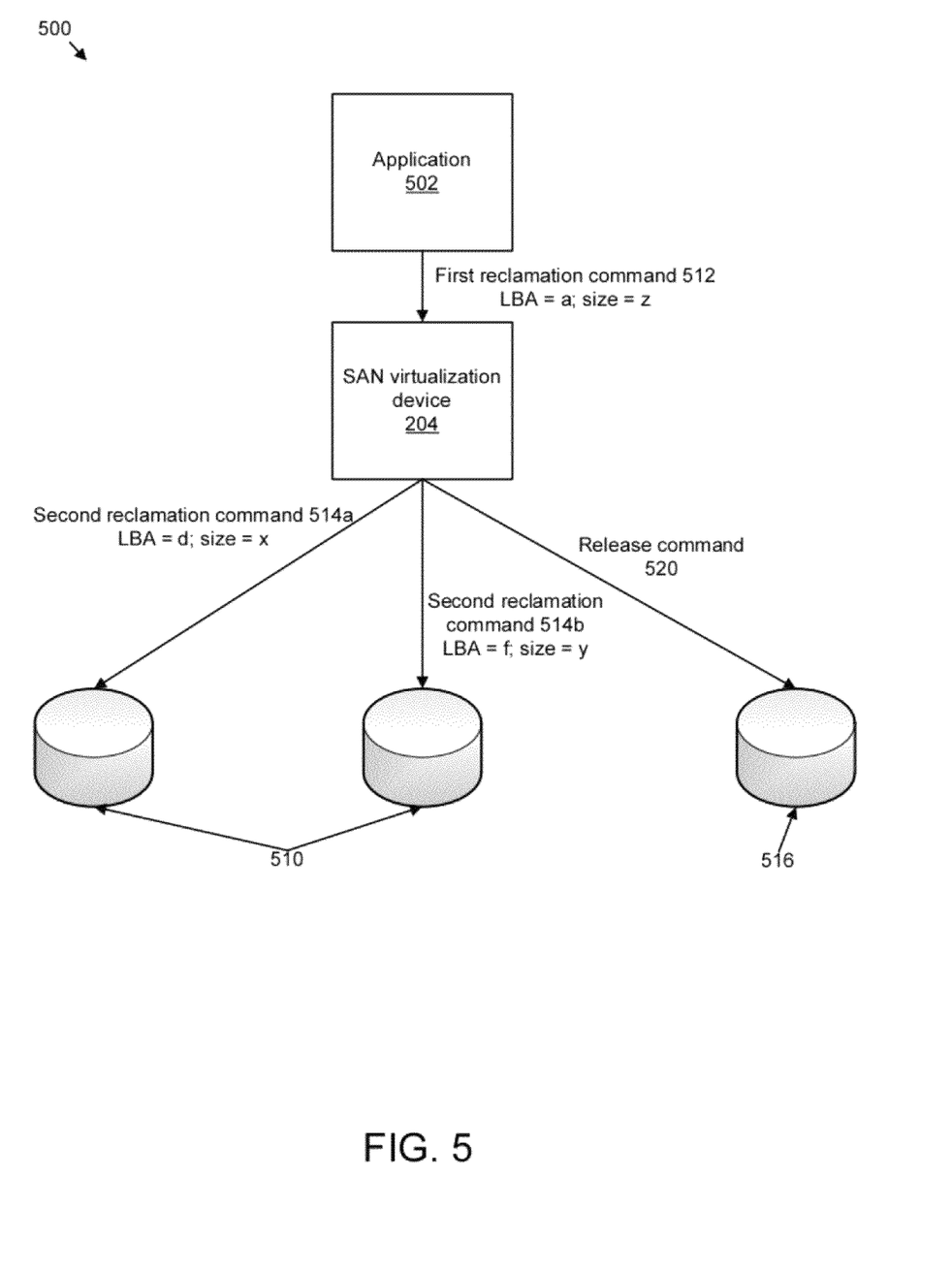
FIG. 5 is an illustrative block diagram showing one embodiment of a system with a SAN virtualization device providing a parent storage volume, and storage devices providing child storage volumes.

FIG. 5 shows one example of how reclamation commands can be effectively propagated to ensure efficient space usage in a multi-layered thinly provisioned system. FIG. 5 shows an application 502. The application 502 uses storage provided by the SAN virtualization device 204. The application 502 may be a file system that uses one or more SAN storage volumes 302 provided by the SAN virtualization device 204. The SAN storage volumes 302 provided by the SAN virtualization device 204 may be thinly provisioned. When the application 502 is finished with a particular set of data, it may send the SAN virtualization device 204 a first reclamation command 512 that identifies the releasable storage space for the SAN virtualization device 204.

The SAN virtualization device 204 uses storage devices 510 and 516 to provide the physical storage for data. These storage devices present the SAN with storage volumes, which may be referred to as child storage volumes 104 (showing the parent-child relationship with the parent storage volume 102 that is provided, in this case, by the SAN virtualization device 204) and disk storage volumes 304 (since the storage volumes are provided by storage devices 510 and 516). In FIG. 5, the storage devices labeled 510 present thinly provisioned disk storage volumes 304, while the storage device labeled 516 does not provide a thinly provisioned disk storage volume 304.

The SAN virtualization device 204 receives the first reclamation command 512 that identifies releasable storage. The SAN virtualization device 204 may return the releasable storage to the free pool supporting the thinly provisioned SAN storage volume 302. The first reclamation command 512 may specify that the releasable storage begins at LBA "a", and is of size "z". The SAN virtualization device 204 may also take additional steps outlined below.

The SAN virtualization device 204 may identify the storage devices 510 that present thinly provisioned disk storage volumes 304. The SAN virtualization device may send second reclamation commands 514a-b to the respective storage devices 510 that identify the releasable storage. The storage devices 510 may then release the storage to the free pools supporting the thinly provisioned disk storage volumes 304.

The SAN virtualization device 204 may need to perform address mapping in sending the second reclamation commands 514a-b. In the example of FIG. 5, the SAN virtualization device 204 may map the address information about the releasable storage space in the first reclamation command 512 (LBA=a; size=z) to different address information in the second reclamation commands 514a-b (LBA=d, size=x for second reclamation command 514a; and LBA=f, size=y for second reclamation command 514b). The address information in the first reclamation command 512 and the combined address information in the second reclamation commands 514*a* and 514*b* may logical equivalents, ensuring that the entire address space for the releasable storage specified in the first reclamation command 512 is released by the second reclamation commands 514*a* and 514*b*. The SAN virtualization device 204 may break down the address range specified in the first reclamation command 512 based on the RAID configuration of the storage devices 510.

In certain embodiments, the SAN virtualization device 204 also translates the format of the first reclamation command 512 to a second format supported by the storage devices 510. For example, SAN virtualization device 204 may support first reclamation commands 512 that are SCSI WRITE Zeros commands. However, the storage devices 510 may support second reclamation commands 514*a-b* that are SCSI WRITE SAME commands. The SAN virtualization device 204 may translate the SCSI WRITE Zero command it receives into one or more SCSI WRITE SAME commands for the storage devices 510.

The SAN virtualization device 204 may send a release command 520 to the storage device 516 that does not provide thinly provisioned disk storage volumes 304 after returning the identified releasable storage to the free pool. As used in this application, the release command 520 is a command that causes the storage device 516 to overwrite the addressed storage being returned to the free pool by the SAN virtualization device 204. Sending a release command 520 may increase security by ensuring that erased data is actually "erased" by an overwriting process. The release command 520 may, for example, instruct that all 0s be written to the address space containing the released storage. The storage devices 510 may similarly issue release commands 520 to overwrite the storage.

In other embodiments, the SAN virtualization device 204 does not send a release command 520 to the storage device 516 that is not thinly provisioned. In one embodiment, the SAN virtualization device 204 receives a first reclamation command 512 that is a WRITE zeros command and passes down the WRITE zeros command to the storage device 516 as a release command 520. In another embodiment, the SAN virtualization device 204 receives a first reclamation command 512 that is a WRITE SAME or a SCSI UNMAP command from the application 502. The SAN virtualization device 204 may interpret such a first reclamation command 512 and translate it into a release command 520 that is a WRITE zeros command, and pass the release command 520 to the storage device 516 that is not thinly provisioned.

Figure 6:
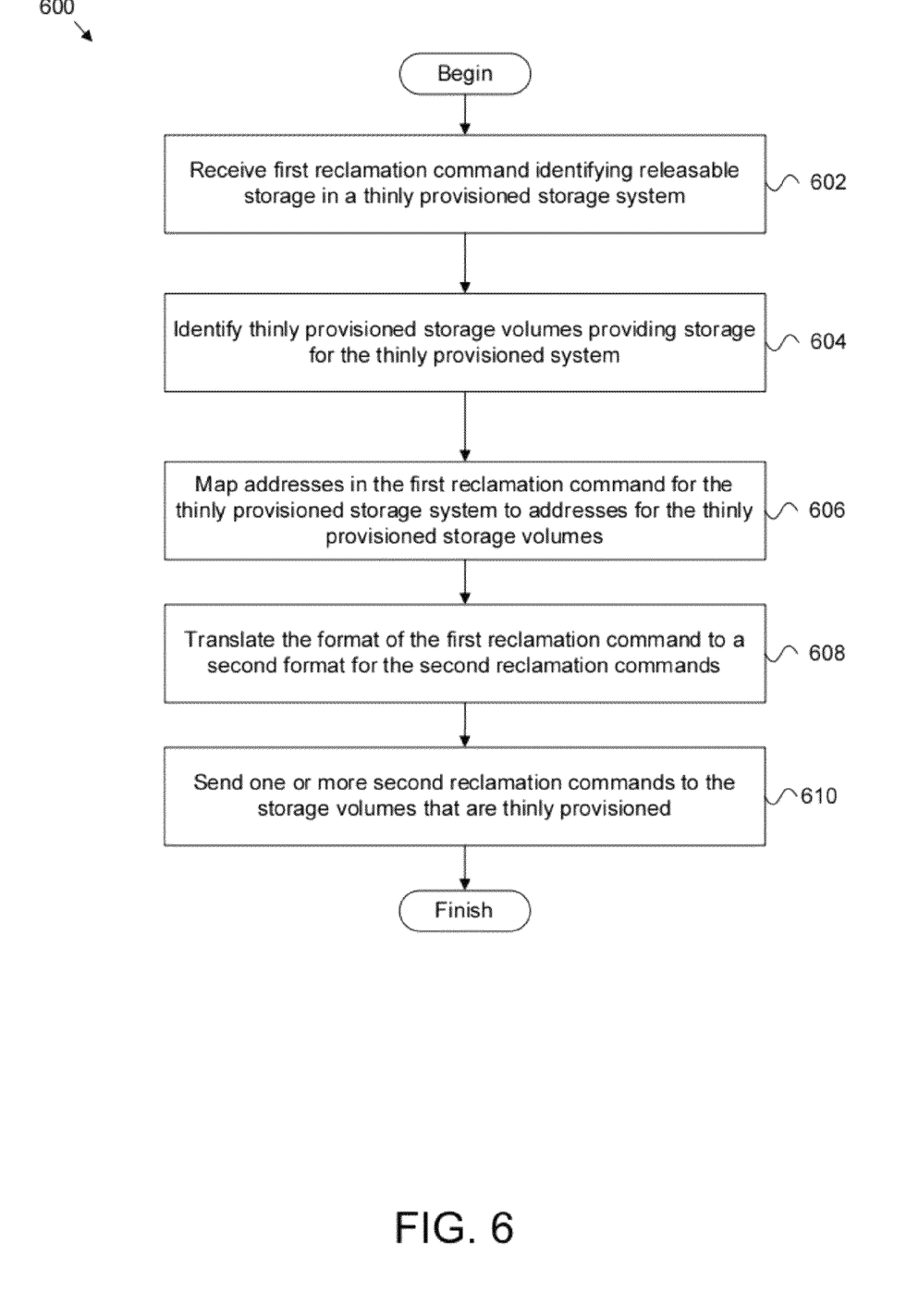
FIG. 6 is a flow chart diagram showing one embodiment of efficient space reclamation in a multi-layered, thinly provisioned system.

FIG. 6 shows one embodiment of a method 600 for efficient space reclamation. In one embodiment, the method 600 begins with receiving 602 a first reclamation command 310 that identifies releasable storage space in a thinly provisioned storage system. The first reclamation command 310 may be received by a host virtualization device 202, a SAN virtualization device 204, or a disk virtualization device 206. The method may also involve the receiving entity releasing the storage space and returning the storage space to the free pool supporting the thinly provisioned system.

In addition to releasing the storage space, the receiving entity may identify 604 those storage volumes that are thinly provisioned and that provide storage for the thinly provisioned storage system. For example, a SAN virtualization device 204 may identify a number of child storage volumes 104 that are thinly provisioned and that support the parent storage volume 102 provided by the SAN virtualization device 204. The child storage volumes 104 may be disk storage volumes 304 provided by disk virtualization devices 206.

In certain embodiments, the method 600 also involves mapping 606 addresses in the first reclamation command 512 that is directed to the thinly provisioned storage system to addresses for the thinly provisioned storage volumes that provide the storage for the thinly provisioned storage system. The method may also include translating 608 the format of the first reclamation command 512 to a second format for the second reclamation commands 514.

The method 600 may further involve sending 610 one or more second reclamation commands to the identified storage volumes that are thinly provisioned. The SAN virtualization device 204 may, for example, send second reclamation commands to the disk virtualization devices 206.

The method 600 may also involve advertising that the thinly provisioned storage volume is thinly provisioned. For example, the SAN virtualization device 204 may advertise that it provides a thinly provisioned SAN storage volume 302. This information may be used by a host virtualization device 202 that uses the SAN storage volume 302. The disk virtualization devices 206 may similarly advertise that they provided thinly provisioned disk storage volumes 304. As noted above, the advertisement may be made by storing a bit in a SCSI inquiry page for the thinly provisioned storage system.

The method 600 may also include releasing the releasable storage space identified in the first reclamation command 310 in addition to sending the second reclamation commands 310.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for efficient space reclamation, the system comprising:
   a storage area network (SAN) virtualization device providing at least one thinly provisioned parent SAN storage volume having logical size larger than physical size and comprised of one or more child disk storage volumes;
   wherein the physical size of the thinly provisioned parent SAN storage volume is provided by the one or more child disk storage volumes;
   a disk virtualization device providing a thinly provisioned child disk storage volume of the child disk storage volumes, the thinly provisioned child disk storage volume having logical size larger than physical size, the disk virtualization device comprising an advertise module that advertises that the thinly provisioned child disk storage volume has logical size larger than physical size;
   a receive module that receives a first reclamation command for the thinly provisioned parent SAN storage volume;
   an identify module that identifies the thinly provisioned child disk storage volume of the child disk storage volumes; and
   a send module that sends a second reclamation command to the disk virtualization device.

2. The system of claim 1, wherein the first reclamation command identifies releasable storage space for the SAN virtualization device.

3. The system of claim 1, wherein the second reclamation command identifies releasable storage space for the disk virtualization device.

4. The system of claim 1, further comprising a plurality of disk virtualization devices, each disk virtualization device providing a thinly provisioned child disk storage volume having logical size larger than physical size.

5. The system of claim 4, wherein the identify module identifies each thinly provisioned child disk storage volume of the disk storage volumes having logical size larger than physical size.

6. The system of claim 5, wherein the send module sends the second reclamation command to each of the plurality of disk virtualization devices.

7. The system of claim 1, the identify module further configured to identify a supported format that is supported by the disk virtualization device providing the thinly provisioned child disk storage volume.

8. The system of claim 1, the identify module further configured to map an address range for the thinly provisioned parent SAN storage volume specified in the first reclamation command to one or more second address ranges for the thinly provisioned child storage volume.

9. A computer program product implemented on a non-transient computer readable storage medium, the computer program product configured to cause:
receiving a first reclamation command for a thinly provisioned parent storage volume comprised of one or more child thinly provisioned storage volumes that provide storage for the thinly provisioned parent storage volume;
wherein the thinly provisioned parent storage volume is a storage volume having a logical size larger than a physical size;
the first reclamation command identifying releasable storage space;
identifying the one or more child thinly provisioned storage volumes that provide storage for the thinly provisioned parent storage volume, each of the one or more child thinly provisioned storage volumes advertising that the child thinly provisioned storage volume is thinly provisioned; and
sending one or more second reclamation commands to at least the one or more child thinly provisioned storage volumes, the one or more second reclamation commands identifying the releasable storage space.

10. The computer program product of claim 9, wherein advertising that the child thinly provisioned storage volume is thinly provisioned comprises storing one or more bits in a small computer system interface (SCSI) inquiry page for the child thinly provisioned storage volume.

11. The computer program product of claim 9, further comprising the thinly provisioned parent storage volume advertising that the thinly provisioned parent storage volume is thinly provisioned.

12. The computer program product of claim 9, wherein the thinly provisioned parent storage volume is managed by a host virtualizer device.

13. The computer program product of claim 9, wherein the one or more child thinly provisioned storage volumes are managed by a storage area network (SAN) virtualizer device.

14. The computer program product of claim 9, further comprising determining which of the one or more child thinly provisioned storage volumes are affected by the first reclamation command.

15. A method for efficient space reclamation comprising:
advertising that a thinly provisioned parent storage volume comprised of one or more child storage volumes is thinly provisioned;
receiving a first reclamation command identifying releasable storage space in the thinly provisioned parent storage volume;
identifying the one or more child storage volumes that are thinly provisioned and that provide storage for the thinly provisioned parent storage volume;
sending one or more second reclamation commands to the one or more child storage volumes that are thinly provisioned and that provide storage for the thinly provisioned parent storage volume.

16. The method of claim 15, wherein advertising comprises storing a bit in a small computer system interface (SCSI) inquiry page for the thinly provisioned parent storage volume.

17. The method of claim 15, wherein the thinly provisioned parent storage volume is managed by a storage area network (SAN) virtualization device, and wherein each child storage volume that provides storage for the thinly provisioned parent storage volume is managed by a disk virtualization device.

* * * * *